EDWARD A. NEWMAN
DAVID O. CLAYDEN
Inventors
By Stevens, Davis, Miller & Mosher
Attorneys EDWARD A. NEWMAN
DAVID O. CLAYDEN
*Inventors*
By Stevens, Davis, Miller & Mosher
*Attorneys*

EDWARD A. NEWMAN
DAVID O. CLAYDEN
Inventors
By Stevens, Davis, Miller & Mosher
Attorneys 2,749,496
Patented June 5, 1956

2,749,496

ELECTRICAL CONTROL SYSTEMS

Edward Arthur Newman, Teddington, and David Oswald Clayden, Heston, England, assignors to National Research Development Corporation, London, England, a corporation of Great Britain Application June 27, 1955, Serial No. 518,266
Claims priority, application Great Britain July 2, 1954
17 Claims. (Cl. 318—314)

The present invention relates to electrical control systems which control the timing of operations in an electrical system. It is particularly applicable to arrangements for controlling the speed of rotation of an electric motor, for example, those in which an electric motor is maintained revolving in step with timing pulses produced by a master timing device so that at the time of occurrence of any timing pulse the angular position of the motor is accurately known.

Arrangements of this type are used, for example, in electronic digital computers and data storage apparatus which store digit signals on rotating magnetic recording drums driven by electric motors, the digit signals being written on to and read from the recording surface of the drum at times which are set by the master timing device, often called the clock pulse generator, of the computer or storage apparatus. In such apparatus, unless an intermediate temporary storage register is used, it is essential to maintain the rotation of the recording drum in step with the clock pulse generator so that digit signals are written on to the recording surface in allocated positions and the required digit signals are read from the recording surface.

In order to synchronize the rotation of the recording drum or like device to the master timing device, means are provided for producing a series of snychronizing pulses from the rotating drum which occur at the repetition rate of the timing pulses produced by the master timing device when the recording drum is rotating at the required speed. The two sets of pulses are compared and a signal indicative of their relative timing is obtained which is applied as an error correcting signal to the motor driving the drum in order to adjust its speed to bring the two sets of pulses into step.

The performance of a control system, the most important feature of which is the speed with which it causes any error to be corrected, is in accordance with the quality of the error correcting signals it produces. Generally, in a control system of the type described in which the timing of two sets of pulses are compared, an error signal will be produced as the result of each comparison and smoothing of the resulting train of error correcting signals will be required to produce a continuous correcting signal. This smoothing operation will delay the correcting signal and so have an adverse effect on the speed of error correction and the performance of the control system.

The invention aims at providing a control system which is capable of providing an error correcting signal to the driving motor which so promptly corrects any speed variation that the timing of a rotating drum or like device may be maintained with suitable apparatus to within at least the order of ten microseconds of the required timing. This degree of accuracy is obtained by arranging for a continuous correcting signal to be obtained in a form which requires only a moderate amount of smoothing which is insufficient to materially delay the error correcting signal.

By the invention, a sawtooth waveform voltage is derived from one of the two sets of pulses, and this sawtooth waveform voltage and the other set of pulses are applied to a clamping circuit which as a result produces an output voltage at the level of the sawtooth waveform voltage at the time of occurrence of each pulse in the set applied to the clamping circuit. This output voltage is arranged to persist until the time of occurrence of the next pulse in the set of pulses applied to the clamping circuit and it is then modified to the latest value of the sawtooth waveform voltage. The output voltage which thus at all times represents the time delay between the occurrence of corresponding pulses in the two sets of pulses is an error correcting signal which requires little smoothing before it is used to modify the electric supply to the electric motor in order to stabilize the speed of rotation of the motor at or as near as possible to a required value.

According to the invention, therefore, an electrical control system for controlling the speed of rotation of an electrical motor by timing pulses having a given repetition rate comprises means for producing a predetermined number of synchronizing pulses during each revolution of the motor, motor driving circuits for driving the motor by an alternating current at an average speed at which synchronizing pulses are produced at the same average repetition rate as timing pulses, a sawtooth waveform generator for producing a sawtooth waveform voltage from either one of the sets of synchronizing pulses or the timing pulses, a clamping circuit to which the sawtooth waveform voltage and the other set of pulses is applied and which produces an output voltage at the time of occurrence of each pulse in the applied set, a storage circuit to which the said output voltage is applied and which stores the present output voltage level until the next output voltage supersedes it, and means for applying the stored output voltage from the storage circuit to the motor driving circuit as an error correcting signal whereby the speed of rotation of the electric motor is rendered more stable with respect to the repetition rate of the timing pulses.

According to a feature of the invention, the motor is driven at a mean speed at which synchronizing pulses are produced at the repetition rate of the timing pulses by arranging for the electrical supply to the motor driving circuits to be derived from the master timing device. It will be appreciated that in these circumstances the output voltage from the clamping circuit must be arranged to be capable of temporarily either increasing or decreasing the speed of the electric motor in order to bring it into step with the master timing device.

By way of example, a magnetic recording drum arrangement in an electronic digital computer which employs an electrical control system according to the invention to synchronize the recording drum to the rest of the computer will now be described with reference to the accompanying drawings in which:

Figure 2 is a circuit diagram showing part of the arrangement shown in Figure 1 in greater detail; while

Figure 1:
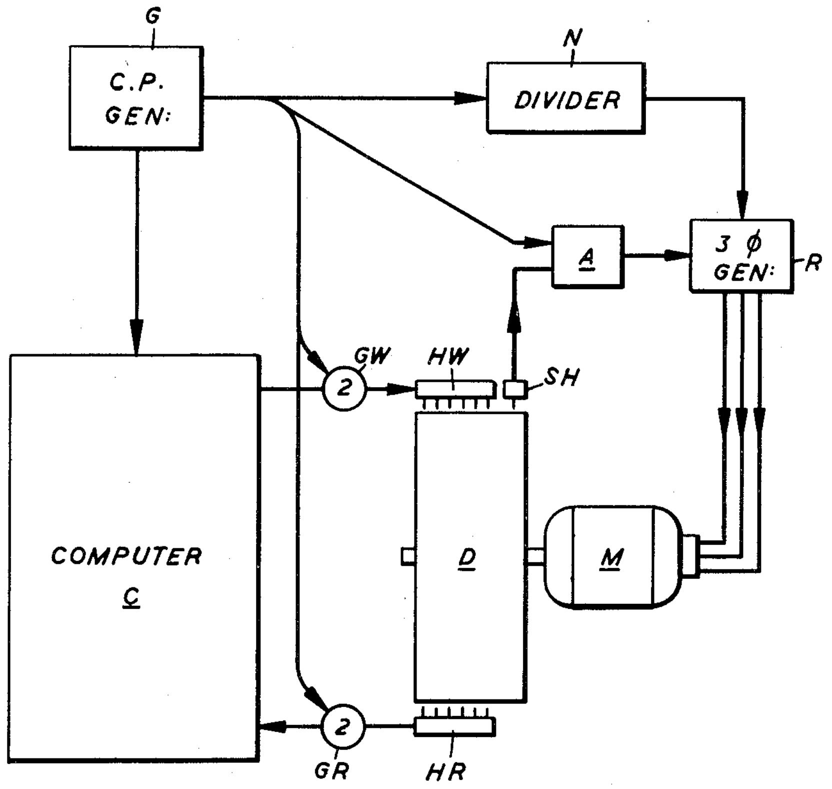
Figure 1 is a schematic diagram of the magnetic recording drum arrangement in a digital computer.

The schematic diagram shown in Figure 1 shows a digital computer which consists essentially of a main computing part C and a magnetic recording drum digital store D, and illustrates schematically the manner in which the recording drum is controlled so that it operates in synchronism with the rest of the computer. The recording drum D supplies digit signals to and records digit signals transferred from the computer C through a read head assembly HR and a write head assembly HW respectively. The digit signals are recorded on one of a number of circular tracks which repeatedly pass under the heads in the write and read head assemblies when the drum D is rotated. The drum D is driven by an electric motor M which is itself supplied with a three-phase alternating current supply from a three-phase motor driving circuit R.

A master timing device in the form of a clock pulse generator G produces timing or clock pulses which control the operation of the computer C by setting successive digit periods during which digit signals occur in a serial train, control the timing of digit signals passing to and from the recording drum D by a write gate GW and a read gate GR respectively, and control the frequency of the three-phase supply from the generator R through a divider N, so that, depending upon the division ratio of the divider, the motor M and the drum D rotate at a synchronous speed at which they rotate once during a predetermined number of digit periods while a predetermined number of clock pulses are generated. As a result the recording drum records or can record this predetermined number of digit signals on each complete circular track.

When used in a digital computer, the recording drum D must revolve at or very close to the synchronous speed so that at all times digit signals supplied from the rest of the computer are recorded on the correct allocated positions on a circular recording track and are subsequently read from the track during preallocated digit periods. The rotation of the drum D must thus be synchronized to within a fraction of a digit period, which is of the order of a microsecond in high-speed electronic digital computers.

The synchronization of the recording drum store to the rest of the computer is achieved by providing a special synchronizing track on the drum D which generates drum clock pulses in a head SH. One drum clock pulse is arranged to be produced for each digit signal position on a complete circular track so that one drum clock pulse is produced for each clock pulse produced by the clock pulse generator G.

The drum clock pulses from the head SH and clock pulses from the generator G are applied to a comparison circuit A which produces an output which depends upon the difference in timing between corresponding pulses in the two pulse trains applied to the circuit. This output is applied to the three-phase motor driving circuit R so as to modify the three-phase output to the motor M to correct any wandering of the speed of rotation of the drum from the synchronous speed.

Figure 2:
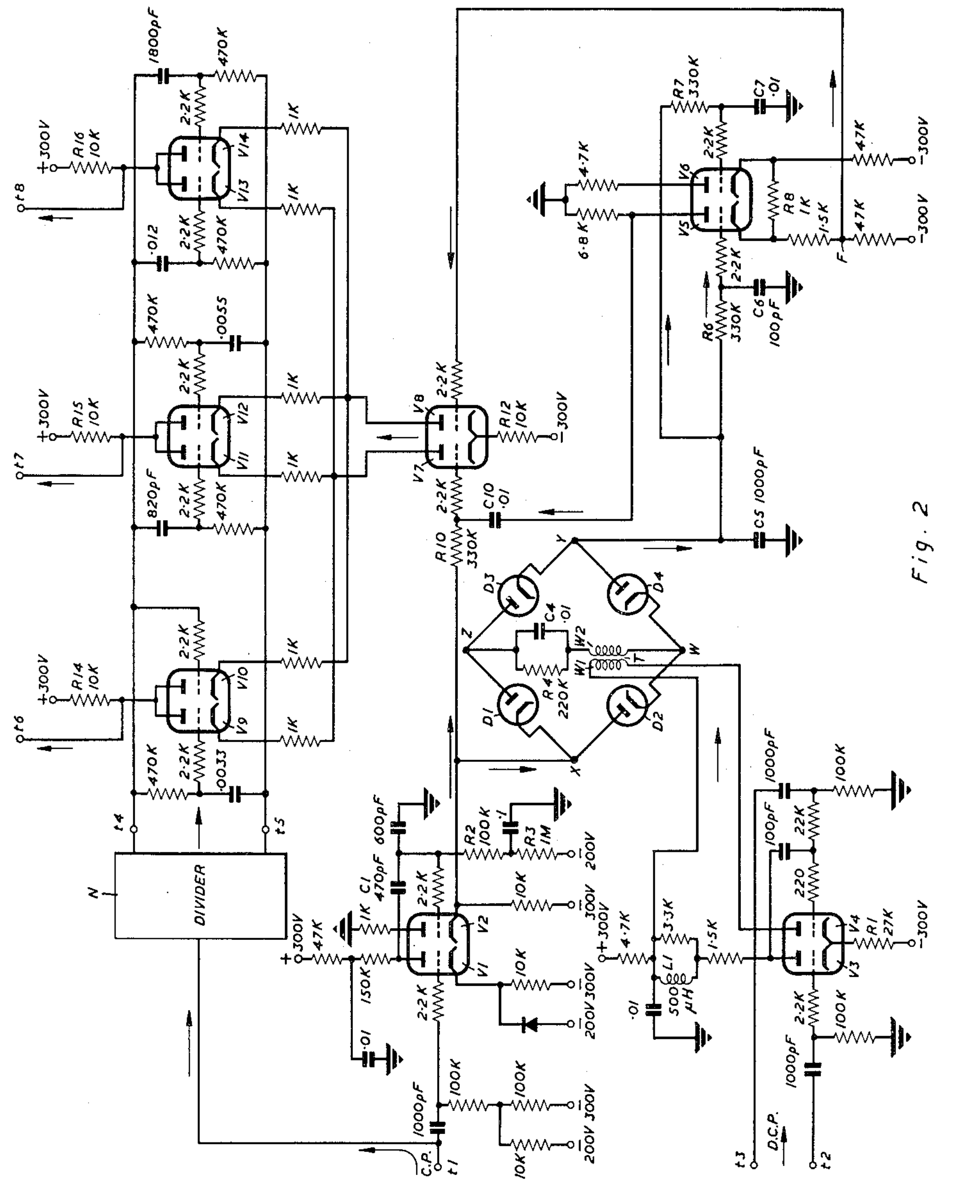

The manner in which the three-phase output of the circuit R is modified in accordance with the relative timing of drum clock pulses and clock pulses from the generator G will now be described in greater detail with reference to Figures 2 and 3. In Figure 2 the values of capacitors are given in microfarads unless otherwise labelled while the double triode valves are all type CV455 except the valves V3 and V4, which is a type CV858. The diode valves D1 to D4 are two type CV140 double diode valves although shown as separate single diode valves in Figure 2.

Figure 3:
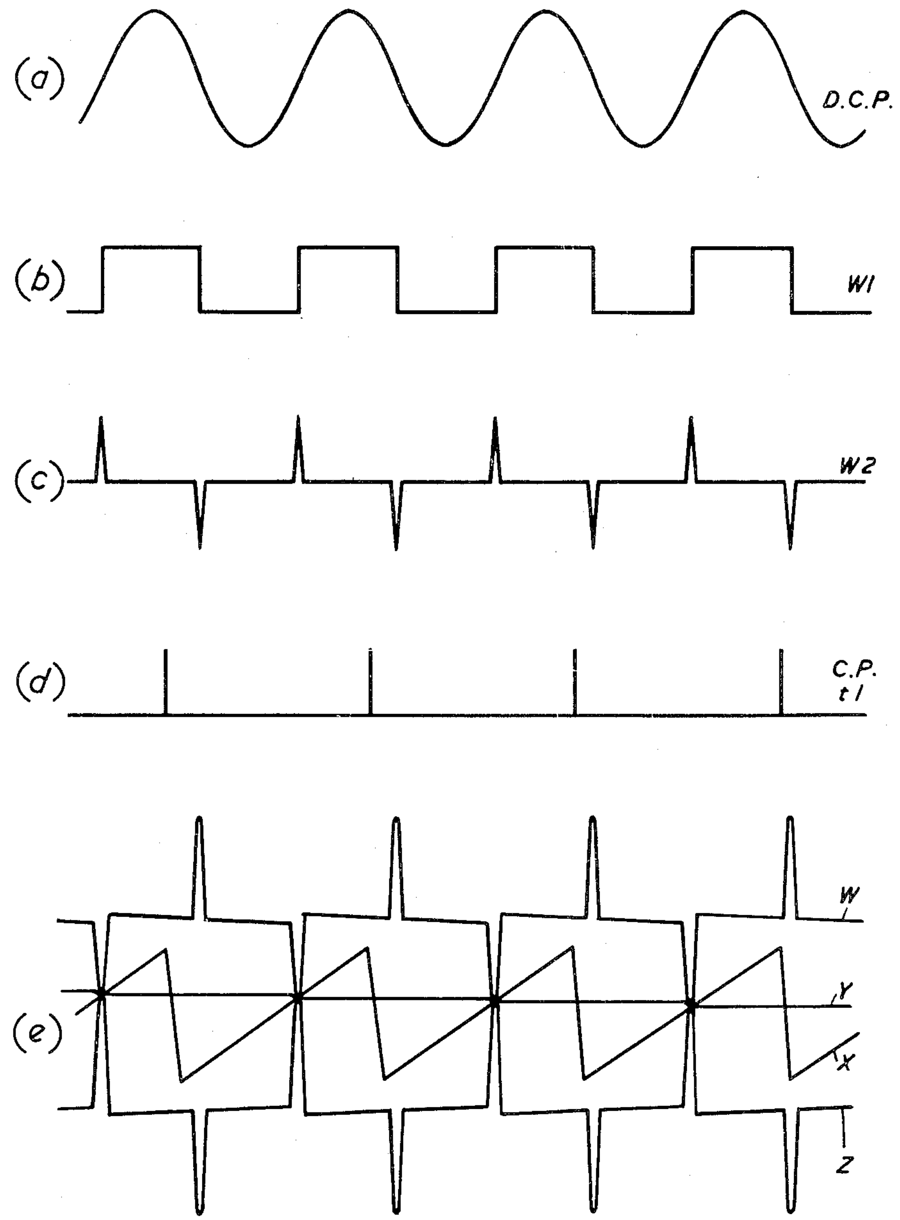
Figure 3 shows waveforms of voltages occurring at various parts of Figure 2.

The output of the head SH when it is scanning the synchronizing track on the rotating drum D is practically a sinusoidal voltage as shown in Figure 3(*a*) at the fundamental frequency of the drum clock pulses, the higher harmonic components of the drum clock pulses being largely lost in the head SH.

The output of the head SH is applied to terminals *t2* and *t3* and hence to the grids of two triode valves V3 and V4 respectively. The valves V3 and V4 have a common cathode resistor R1 and act as a long-tailed pair so that during the half cycles when the voltage on the terminal *t3* is positive with respect to that on the terminal *t2* the valve V4 fully conducts and the valve V3 is cut off, while during the other half cycles when the voltage on the terminal *t2* is more positive, the valve V3 fully conducts and the valve V4 is cut off. As a result a current pulse having a rectangular waveform as shown in Figure 3(*b*) is produced across the primary winding W1 of a transformer T connected in the anode circuit of the valve V4. The sharpness of the positive-going edge of the rectangular waveform produced across the winding W1 is enhanced by the action of an inductor L1 incorporated in the anode circuit of the valve V3.

Clock pulses CP as shown in Figure 3(*d*) from the clock pulse generator of the computer are applied from a terminal *t1* to the grid of a triode valve V1 which serves to amplify the input pulses. The output on the anode of the valve V1 is applied to the grid of a triode valve V2 which acts as a sawtooth waveform generator in the following manner.

When a negative-going pulse occurs on the anode of the valve V1 due to a positive-going clock pulse applied to the grid of the valve, the grid potential of the valve V2 is driven negatively and then rises slowly as the capacitor C1 discharges through the resistors R2 and R3 until it is driven negatively again when the next clock pulse is applied. The valve V2 is connected as a cathode follower so that an output sawtooth waveform voltage, shown as the waveform X in Figure 3(*e*), is obtained from the cathode of the valve.

A clamp circuit comprising a four arm rectifier bridge consisting of four diodes D1 to D4 produces an output on the point Y indicative of the time displacement between the clock pulses applied to the terminal *t1* and the drum clock pulses applied to the terminals *t2* and *t3*. This output is produced by applying the sawtooth waveform voltage, shown as the waveform X in Figure 3(*e*), to the rectifier bridge at a point X and by applying the rectangular current pulses as shown in Figure 3(*b*) to the primary winding W1 of a transformer T, having a secondary winding W2 in series with a parallel-connected resistor R4 and capacitor C4 between points W and Z.

When a series of rectangular current pulses as shown in Figure 3(*b*) is applied to the primary winding W1 of the transformer T it induces a succession of alternate positive-going and negative-going voltage pulses as shown in Figure 3(*c*) in the secondary winding W2 of the transformer T. The positive-going pulses cause the diodes D1 to D4 to conduct and charge up the capacitor C4. If the parallel resistor R4 were not present the potential difference thus established between the points W and Z would be built up to and then maintained at the peak value of the positive-going pulses. The resistor R4 however partially discharges the capacitor C4 between positive-going pulses so that the resulting potentials on the points W and Z are as shown by the waveforms W and Z in Figure 3(*e*) and thus when the positive-going pulses are about to be applied the potential difference is less than the peak value. As a result when the positive-going pulses are applied the point Z is driven slightly positive with respect to the point W and the diodes D1 to D4 conduct and recharge the capacitor C4.

The current flow through the diodes D1 to D4 makes the potential on the points W, Y and Z substantially the same as that of the sawtooth waveform voltage on the point X from the low impedance cathode follower circuit involving the valve V2. When the positive-going voltage pulse has terminated, the diodes D1 to D4 cease to conduct and the potential on the point Y cannot be affected by the potential on the point X until the time of occurrence of the next positive-going pulse from the transformer T. The potential on the point Y is stored in a storage capacitor C5 and as a result the potential on the point Y is clamped at the value of the sawtooth waveform voltage on the point X at the time of occurrence of a positive-going pulse and will remain at this value until the next positive-going pulse occurs. This action is illustrated by Figure 3(*e*) in which the waveform Y shows the resulting clamped potential on the point M as a reasonably level waveform having only some shallow steps which require a little smoothing.

The potential on the capacitor C5, after having been smoothed somewhat by the action of a resistor R6 and a capacitor C6, is applied to the grid of a triode valve V5 which, acting as a cathode follower, produces a corresponding output on a point F. The potential on the capacitor C5 is also applied to the grid of a triode valve V6 through an integrating circuit comprising a resistor R7 and a capacitor C7 which in effect delays the application of any potential changes to the grid of the triode valve V6. The valve V6 is a cathode follower having its cathode connected to the cathode of the valve V5 through a resistor R8 having a resistance value which is high compared with the cathode impedance of either of the valves V5 and V6. As a result, although the potential on the point F is only slightly affected by this inter-cathode connection, the valve current through the valve V5 is changed sufficiently by the flow of current through the resistor R8 to produce an output on the anode of the valve V5 which is substantially the differential of the potential on the point Y, that is, it is propertinoal to the rate of change of the potential on the point Y.

The timing relationship between the clock pulses CP from the generator G and the drum clock pulses DCP is arranged to be as close as possible to that for which the positive-going pulses produced in the winding W2 as shown in Figure 3(c) occur at the mid-times between the clock pulses as shown in Figure 3(d). This arrangement is made because there is half an inter-pulse period tolerance either way from this midtimes position before the synchronization between the two pulse trains is lost by slipping to a position at which the synchronizing system functions to synchronize one inter-pulse period ahead or behind.

As a result it is arranged for the seignal which is fed to the three-phase motor driving circuits to be in accordance with the time difference between the positive-going pulses derived from the drum clock pulses and the mid-times between clock pulses from the generator G. This is carried out by comparing in a pair of valves V7 and V8 the mean value of the sawtooth waveform voltage (which represents the mid-times between clock pulses CP) with the value of the sawtooth waveform clamped on the point Y (which represents the timing of the drum clock pulses DCP). In order to do this the correction signal on point F is fed to a triode valve V8 while the D. C. component of the sawtooth waveform voltage is applied to the grid of a triode valve V7 after having been smoothed by an integrating circuit comprising a resistor R10 and capacitor C10. The capacitor C10 is connected to the anode of the valve V5, and as a result the potential applied to the grid of the valve V7 is the mean potential of the sawtooth waveform voltage modified in a negative sense by the differential of the clamped potential on the point Y, while the potential applied to the grid of the valve V8 is the clamped potential on the point Y in a positive sense.

The valves V7 and V8 are connected as a long-tailed pair having a common cathode resistor R12 of sufficient value to assure that the sum of their valve currents has a substantially constant value. In these circumstances the proportion of the total current which passes through either one of the two valves is determined by the amount that the clamped potential on the point Y differs from the mean potential of the sawtooth waveform voltage. The valve currents of the valves V7 and V8 are used to control the three-phase motor driving circuits and the modification to the input signal to the valve V7 owing to the connection to the anode of the valve V5 reduces the hunting induced in the motor. The three-phase driving circuits comprise a set of triode valves V9 to V14 and their associated circuits and operate in the following manner. A sinusoidal voltage, at the frequency at which the motor and drum are required to be rotated, and derived in any well known manner from the clock pulses CP by a divided circuit N, is produced across the terminals t4 and t5. This sinusoidal voltage is supplied directly to the grid of the valve V10, to the grid of the valve V12 through a circuit which imposes a phase change of 120 degrees, and to the grid of the valve V14 through a circuit which imposes a phase change of 240 degrees in the same sense. As a result the valves V10, V12 and V14 are controlled by three-phase voltages 120 degrees apart in phase.

The sinusoidal voltage from the divider N is applied to the grids of the valves V9, V11 and V13 through phase changing circuits which produce phase changes of 90 degrees more than those produced on the inputs to the valves V10, V12 and V14 respectively with the result that the valves V9, V11 and V13 are also controlled by three-phase voltages 120 degrees apart in phase, whose phase timings are 90 degrees behind the three-phase voltages controlling the valves V10, V12 and V14. Each valve pair, consisting of the valves V9 and V10, V11 and V12, and V13 nad V14, has a common anode resistor R14, R15 and R16 respectively so that, provided the division of the valve currents through each valve of a valve pair is the same for each of the three pairs, the voltages produced on output terminals t6, t7 and t8 connected to the common anodes of the first, second and third valves pairs respectively are three-phase voltages 120 degrees apart in phase. The phase timing of this resultant three-phase output relative to that supplied to the grids of the valves V10, V12 and V14 will depend upon the relative strengths of the component currents through the two valves of each valve pair.

As shown in Figure 2, the cathodes of the valves V9, V11 and V13 are connected to the valve V7 and the cathodes of the valves V10, V12 and V14 are connected to the valve V8 so that the relative strengths of the valve currents through each valve pair is determined by the condition of the valves V7 and V8 and hence by the relative timing of the mid-times between clock pulses from the generator G and the drum clock pulses.

The phase timing of the resultant three-phase output will of course be intermediate to that of the two three-phase components and in settled conditions will be about mid-way between the phase timings of the two components. If, however, the timing of the motor and recording drum and hence the timing of the drum clock pulses DCP lags by more than the required half cycle behind that of the clock pulses CP, as illustrated by Figures 3 (c) and 3(d) in which the pulses on the winding W2 (directly derived from the drum clock pulses DCP) so lag with respect to clock pulses CP on the terminal t1, then, as illustrated in Figure 3(e), the output on the point Y will be greater than the average value of the sawtooth waveform voltage and the valve V8 will pass more current than the valve V7. As a result the leading three-phase component will be larger than the other component and the resultant three-phase output will have its phase timing advanced causing a corresponding advance in the timing of the motor, the recording drum and the drum clock pulses DCP.

Similar but opposite compensating conditions apply when the timing of the motor and recording drum becomes advanced with the result that the phase timing of the three-phase supply from the terminals t6, t7 and t8 to the motor is so controlled by the motor driving circuits that the timing of the recording drum keeps very close to that of the clock pulse generator and hence to the rest of the computer.

Although the phase timing difference between the two three-phase components of the three-phase supply to the motor is 90 degrees in the circuit shown in Figure 2, this phase timing difference may if desired be made appreciably greater or less than 90 degrees in spite of the fact that a phase timing difference of about 90 degrees produces the best practical conditions. Thus the phase timing difference may be made 60 degrees or 45 degrees or even less with the advantage that these smaller phase timing differences give a resultant with a better waveform and which undergoes smaller changes in magnitude when variations occur. Small phase timing differences have the disadvantage however, that changes in the relative strengths of the currents passing through the valves V7 and V8 produce smaller changes in the phase timing of the resultant three-phase output so that the gain of the servo system is less. Phase timing differences up to about 120 degrees or even 135 degrees may be used but larger phase timing differences would be unsatisfactory as the resultant three-phase output gets progressively smaller than either component and its waveform gets progressively worse as the phase timing difference increases.

The circuit arrangement shown in Figure 2 utilises clock pulses CP to produce the sawtooth waveform voltage which is applied to the point X in the diode bridge clamp circuit, while drum clock pulses DCP are applied to the transformer T. It will be appreciated that the input arrangements associated with the terminals *t1*, *t2* and *t3* may be modified if necessary to receive drum clock pulses DCP on terminal *t1* and clock pulses CP on terminals *t2* and *t3* so that the functions of the clock pulses and drum clock pulses are interchanged without affecting the operation of the rest of the circuit arrangement shown in Figure 2.

The control system which has been described with reference to the drawings controls the speed of rotation of a three-phase electric motor. It may readily be adapted to control a single-phase electric motor by employing only one pair of valves V9 and V10 say and their associated circuits instead of the three pairs of valves V9 and V10, V11 and V12, and V13 and V14 and their associated circuits. If this adaptation is made the anodes of the valves V7 and V8 should each be coupled to a source of fixed potential in order to maintain steady operating conditions for these valves. Each coupling may be a resistor of one kilohm connected to earth potential.

We claim:

1. An electrical control system for controlling the speed of rotation of an electric motor by timing pulses having a given repetition rate and comprising means for producing a predetermined number of synchronizing pulses during each revolution of the motor, motor driving circuits for driving the motor by an alternating current at an average speed at which synchronizing pulses are produced at the same average repetition rate as timing pulses, a sawtooth waveform generator for producing a sawtooth waveform voltage from either one of the sets of synchronizing pulses or the timing pulses, a clamping circuit to which the saw tooth waveform voltage and the other set of pulses are applied and which produces an output voltage at the time of occurrence of each pulse in the applied set, a storage circuit to which the said output voltage is applied and which stores the present output voltage level until the next output voltage supersedes it, and means for applying the stored output voltage from the storage circuit to the said motor driving circuits as an error correcting signal whereby the speed of rotation of the electric motor is rendered more stable with respect to the repetition rate of the timing pulses.

2. An electrical control system according to claim 1 and having a master timing device for generating said timing pulses, and means for controlling the frequency of the alternating current used to drive the motor by the master timing device.

3. An electrical control system according to claim 1 and in which the said motor driving circuits includes a phase changing circuit for modifying the phase of the alternating current applied to the electric motor, and means for controlling the phase changing circuit by the said error correcting signal.

4. An electrical control system according to claim 2 and in which said motor driving circuits includes means for producing a first alternating current and a similar and separate second alternating current having a common frequency controlled by the said master timing device and which differ in phase by a fixed fraction of a wavelength between about one-eigthth and three-eighths of a wavelength, means for adjusting the relative strengths of the said first and second alternating currents in accordance with the said error correcting signal, and means for combining said first and second alternating currents to produce a resultant alternating current for driving the electric motor whose phase is intermediate between those of its two constituent alternating currents and is dependent upon the error correcting signal.

5. An electrical control system according to claim 4 and in which the said motor driving circuits includes a first valve and a second similar valve each having an anode, a cathode and at least one grid, a common cathode circuit to the two valves having a resistor of sufficient magnitude to limit to a substantially constant value the total valve current flowing through the two valves, means for deriving the average value of the sawtooth waveform voltage and applying it to the control grid of the first valve, means for applying the error correcting signal produced from the storage circuit to the control grid of the second valve whereby the relative strengths of the currents flowing through said two valves is dependent upon the error correcting signal, a first control circuit fed with the first valve current and the first alternating current and producing an alternating current output whose strength is proportional to the first valve current, and a second control circuit fed with the second valve current and the second alternating current and producing an alternating current output whose strength is proportional to the second valve current.

6. An electrical control system according to claim 5 and in which the said first control circuit comprises a valve having an anode, a cathode, and at least one grid and having its cathode connected to the anode circuit of said first valve and its control grid fed with the first alternating current, and in which the said second control circuit comprises a valve having an anode, a cathode, and at least one grid and having its cathode connected to the anode circuit of said second valve and its control grid fed with the second alternating current, a common anode resistor connected to the anodes of the two valves and an output connection to the common anode point of the two valves and through which an alternating current flows which is the combination of the first and second alternating currents in strengths proportional to the first and second valve currents.

7. A signal storage system comprising an electric motor, a recording drum rotated by the electric motor and having signal storage tracks and a synchronizing track along which synchronizing pulses are recorded at regular intervals, a reading head associated with the synchronizing track and from which synchronizing pulses are read out as the drum rotates, a mster timing device which produces timing pulses at a given repetition rate, a generator of an alternating current for driving the electric motor, means for controlling the frequency of the alternating current by the master timing device so that the speed of the electric motor is such that synchronizing pulses occur on the average at the said given repetition rate, a comparison circuit to which the synchronizing pulses and timing pulses are applied and which compares the phase of the synchronizing and timing pulses and produces an error correcting signal as a result of this comparison, means for applying the error correcting signal to the alternating current generator to alter the phase of the alternating current which it supplies to the electric motor in order to change the timing of the motor and hence the recording drum and the synchronizing pulses produced therefrom in such a sense as to reduce the error correcting signal.

8. A signal storage system according to claim 7 and in which the said comparison circuit has means for producing a sawtooth waveform voltage from the applied synchronizing pulses, a clamping circuit to which the sawtooth waveform voltage and the applied timing pulses are fed and which produces an output voltage at the time of occurrence of each timing pulse, a storage circuit to which the said output voltage is applied and which stores the present output voltage level until the next output voltage supersedes it and produces therefrom the said error correcting signal.

9. A signal storage system according to claim 7 and in which the said comparison circuit has a sawtooth waveform generator for producing a sawtooth waveform voltage from the applied timing pulses, a clamping circuit to which the sawtooth waveform voltage and the applied synchronizing pulses are fed and which produces an output voltage at the time of occurrence of each synchronizing pulse, a storage circuit to which the said output voltage is applied and which stores the present output voltage level until the next ouput voltage supersedes it and produces therefrom the said error correcting signal.

10. An electrical circuit arrangement for producing an alternating current whose phase is dependent upon the amplitude of a variable amplitude signal and comprising means for producing a first alternating current and a similar second alternating current having a common frequency and which differ in phase by a fixed fraction of a wavelength between about one-eighth and three-eighths of a wavelength, means for adjusting the relative strengths of the first and second alternating currents in accordance with the amplitude of the said signal, and means for combining said first and second alternating currents to produce a resultant alternating current whose phase is intermediate between those of its two constituent alternating currents and is dependent upon the amplitude of the said signal.

11. An electrical circuit arrangement for producing an alternating current whose phase is dependent upon the amplitude of a variable amplitude signal and comprising means for producing a first alternating current and a similar second alternating current having a common frequency and which differ in phase by a fixed fraction of a wavelength between about one-eighth and three-eighths of a wavelength, a first valve and a second similar valve each having an anode, a cathode and at least one grid, a common cathode circuit to the two valves having a resistor which limits to a substantially constant value the total valve current flowing through the two valves, means for deriving a steady amplitude signal, means for applying the steady amplitude signal to the control grid of the first valve and the said variable amplitude signal to the control grid of the second valve whereby the relative value of the first and second valve currents is dependent upon the amplitude of the variable amplitude signal, a first control circuit fed with the first valve current and the first alternating current and producing a first alternating current output whose strength is proportional to the first valve current, a second control circuit fed with the second valve current and the second alternating current and producing a second alternating current output whose strength is proportional to the second valve current, and means for combining said first and second alternating current outputs to produce a resultant alternating current whose phase is intermediate between those of its two constituent alternating currents and is dependent upon the amplitude of the said variable amplitude signal.

12. An electrical circuit arrangement according to claim 11 and in which the said derived steady amplitude signal has an amplitude equal to the mean value of the said variable amplitude signal.

13. An electrical circuit arrangement for producing an alternating current whose phase is dependent upon the amplitude of a variable amplitude signal and comprising means for producing a first alternating current and a similar second alternating current having a common frequency and which differ in phase by a fixed fraction of a wavelength between about one-eighth and three-eighths of a wavelength, a first and second control valve each having an anode, a cathode and at least one grid, means for applying the first alternating current to the control grid of said first control valve and the second alternating current to the control grid of said second control valve, means for deriving a steady amplitude signal, means for applying the variable amplitude signal and the mean valued signal to the cathode connections of said first and second control valves respectively to control the amplitudes of the first and second control valve currents, a common anode resistor connected to the anodes of the two control valves and an output connection to the common anode point of the two control valves and on which an alternating current is produced which is the combination of the first and second alternating currents in strengths proportional to the first and second control valve currents and which is dependent in phase on the amplitude of the variable amplitude signal.

14. An electrical circuit arrangement according to claim 13 and in which the said derived steady amplitude signal has an amplitude equal to the mean value of the said variable amplitude signal.

15. An electrical circuit arrangement for producing a three-phase alternating current whose phase timing is dependent upon the amplitude of a variable amplitude signal and comprising means for producing a first three-phase alternating current and a similar second three-phase alternating current having a common frequency and which differ in phase timing by a fixed fraction of a wavelength between about one-eighth and three-eighths of a wavelength, means for adjusting the relative strengths of the first and second three-phase alternating currents in accordance with the amplitude of the said signal, and means for combining said first and second three-phase alternating currents to produce a resultant three-phase alternating current whose phase timing is intermediate between those of its two constituent alternating currents and is dependent upon the amplitude of the said signal.

16. An electrical circuit arrangement for producing a three-phase alternating current whose phase timing is dependent upon the amplitude of a variable amplitude signal and comprising means for producing a first three-phase alternating current and a second similar three-phase alternating current therefrom which differs in phase timing by a fixed fraction of a wavelength between about one-eighth and three-eights of a wavelength, a first and second control valve for each of the three phases each valve having an anode, a cathode and at least one grid, means for applying the three phase currents of the first three-phase alternating current to the control grids of the three first control valves, means for applying the corresponding three phase currents of the second three-phase alternating current to the control grids of the corresponding three second control valves, a valve pair comprising a first valve and a second similar valve each valve having an anode, a cathode and at least one grid, a common cathode circuit to the two valves having a resistor which limits to a substantially constant value the total valve current flowing through the two valves, means for deriving a steady amplitude signal, means for applying the steady amplitude signal to the control grid of the first valve and the said variable amplitude signal to the control grid of the second valve of the valve pair whereby the relative value of the first and second valve currents is dependent upon the amplitude of the variable amplitude signal, means for connecting the anode circuit of the first valve of the said valve pair to the cathode circuit of each of the three first control valves and the anode circuit of the second valve to the cathode circuit of each of the three second control valves whereby the relative values of the first and second control valve currents of a given phase is dependent upon the amplitude of the variable amplitude signal, a common anode resistor connected to the anodes of the two control valves of each phase and an output connection to the common anode point of each phase and on which the constituent phase currents of a three-phase alternating current is produced which is the combination of the first and second three-phase alternating currents in strengths proportional to the first and second control valve currents.

17. An electrical circuit arrangement according to claim 16 and in which the said derived steady amplitude signal has an amplitude equal to the mean value of the said variable amplitude signal.

No references cited.